United States Patent [19]

Bollen et al.

[11] Patent Number: 5,321,941
[45] Date of Patent: Jun. 21, 1994

[54] COMPACT CORD HAVING PREFORMED OUTER FILAMENTS

[75] Inventors: Jan Bollen, Louvain; Luc Bourgois, Desselgem; Bernard Huysentruyt, Zwevegem, all of Belgium

[73] Assignee: N.V. Bekaert S.A., Zwevegem, Belgium

[21] Appl. No.: 768,199
[22] PCT Filed: Sep. 5, 1990
[86] PCT No.: PCT/EP90/01542
§ 371 Date: Oct. 25, 1991
§ 102(e) Date: Oct. 25, 1991
[87] PCT Pub. No.: WO91/04370
PCT Pub. Date: Apr. 4, 1991

[30] Foreign Application Priority Data
Sep. 18, 1989 [EP] European Pat. Off. ........ 89202333.4

[51] Int. Cl.⁵ .................. D02G 3/36; B60C 9/00; B60C 9/02
[52] U.S. Cl. ........................ 57/213; 57/214; 57/311; 152/451
[58] Field of Search ............ 57/213, 214, 215, 216, 57/217, 311; 152/451

[56] References Cited

U.S. PATENT DOCUMENTS

| 4,158,946 | 6/1979 | Bourgois ............... 152/451 X |
| 4,332,131 | 6/1982 | Palsky et al. ............. 57/213 |
| 4,333,306 | 6/1982 | Yamashita et al. ....... 57/213 X |
| 4,488,587 | 12/1984 | Umezawa et al. ...... 152/451 X |
| 4,572,264 | 2/1986 | Umezama et al. ...... 152/451 |
| 4,586,324 | 5/1986 | Mizuma ................ 152/451 X |
| 4,627,229 | 12/1986 | Bourgois .................. 57/213 |
| 4,628,683 | 12/1986 | Bourgois et al. .......... 57/213 |
| 4,724,663 | 2/1988 | Bourgois et al. ........... 57/15 |
| 4,738,096 | 4/1988 | Natakeyama et al. ..... 57/236 X |
| 4,783,955 | 11/1988 | Uchio ..................... 57/213 |
| 4,986,327 | 1/1991 | Takahira ............. 152/451 X |

FOREIGN PATENT DOCUMENTS 0168857 1/1986 European Pat. Off. .
2080845 2/1982 United Kingdom ............ 57/215

OTHER PUBLICATIONS

"Survey of Mechanical Properties of Steel Cord and Related Test Methods," Reprint from *Special Technical Publication 694*, L. Bourgois, pp. 19-46, 1980.

Primary Examiner—Daniel P. Stodola
Assistant Examiner—William Stryjewski
Attorney, Agent, or Firm—Foley & Lardner

[57] ABSTRACT

A steel cord (1) for the reinforcement of rubber articles such as tires includes a core of two to four steel filaments (2) and a layer of steel filaments (3, 4) around the core. All of the filaments have a diameter between 0.15 and 0.40 mm and are twisted in the same direction and at the same pitch. The cord has over a substantial portion of its entire length cross-sections where the accumulated gaps between adjacent layer filaments are at least 0.03 mm. At least one filament of the layer has been preformed differently from the other filaments. The above structure avoids core migration.

8 Claims, 4 Drawing Sheets

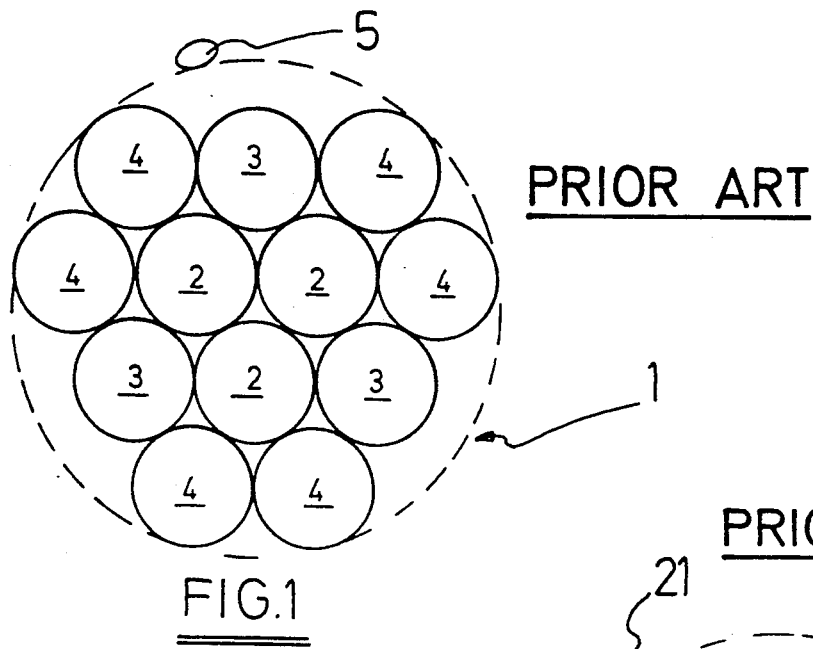
FIG.1 PRIOR ART
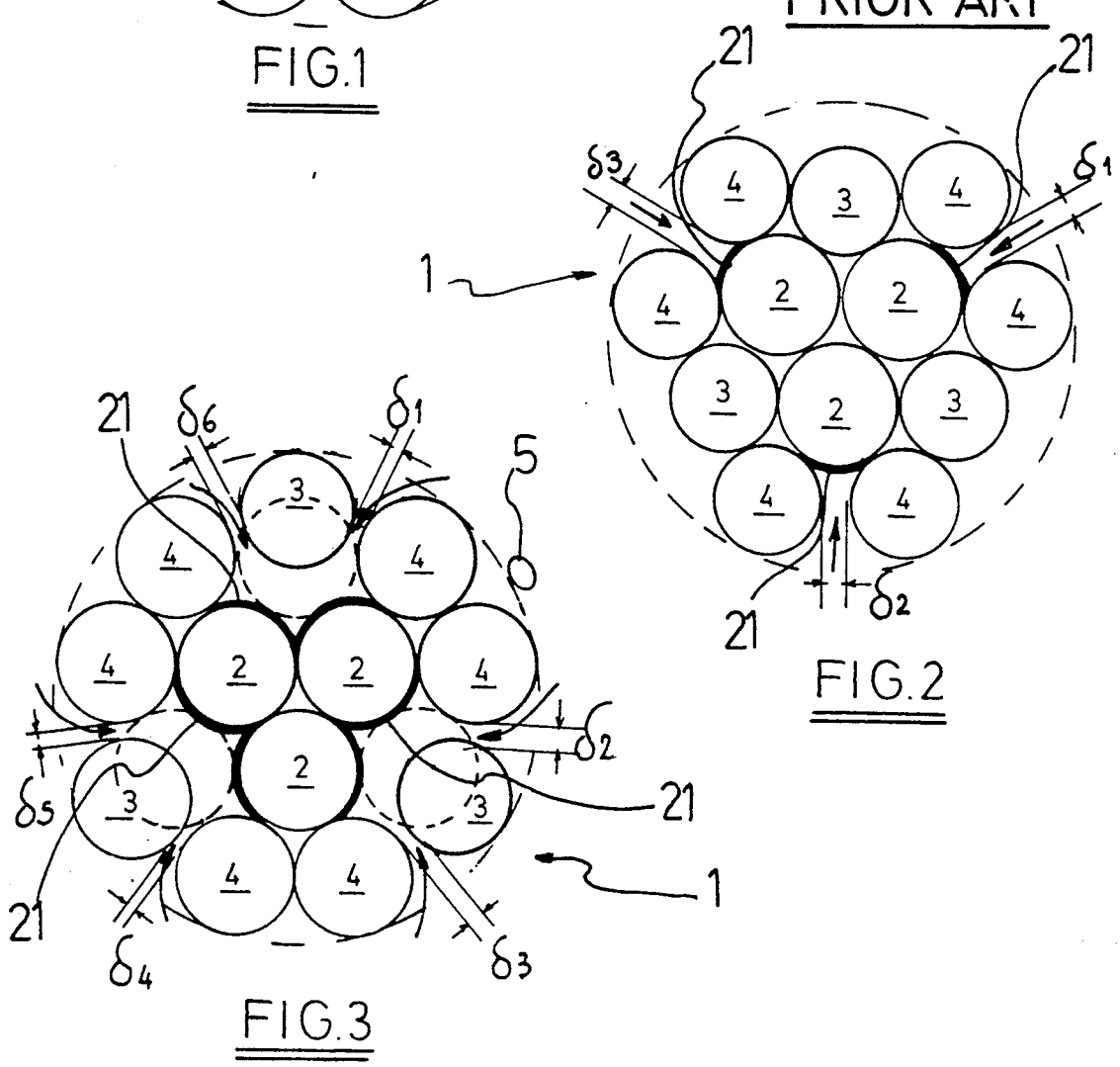
FIG.2 PRIOR ART
FIG.3

COMPACT CORD HAVING PREFORMED OUTER FILAMENTS

BACKGROUND OF THE INVENTION

1. Field of the Invention

The present invention relates to a steel cord for the reinforcement of rubber articles comprising a core consisting of two to four steel filaments, and one layer of steel filaments around the core. The layer consists of filaments which face two filaments of the core and which form an inner-sheath, and of filaments which face only one filament of said core and which form an outer-sheath. All these filaments are twisted in the same direction and at the same pitch.

2. Description of the Related Art

A steel cord for the reinforcement of rubber articles conveniently comprises steel filaments having a carbon content of more than 0.60 per cent by weight (e.g. more than 0.65% 0.78%, 0.82% or 0.90%). A typical steel composition is:a minimum carbon content above 0.65% a manganese content between 0.40% and 0.70%, a silicon content between 0.15% and 0.30% and a maximum sulphur and maximum phosphorus content of 0.03%, all percentages being percentages by weight. Other elements such as chromium or boron or vanadium may also be alloyed.

The diameter of such steel filaments lies in the range of 0.05 mm to 0.80 mm, preferably in the range of 0.15 mm to 0.40 mm (e.g. 0.23 mm, 0.26 mm or 0.32 mm).

The steel filaments are usually provided with a coating which promotes the adherence of steel wire to rubber articles.

Such a coating conveniently comprises copper, zinc, brass or ternary brass alloy, or a combination of two or more different layers thereof. The thickness of the coating ranges from 0.05 to 0.40 micron, preferably from 0.12 to 0.22 micron. The coating may also be present in the form of a thin film of chemical primer material for ensuring good rubber penetration and adhesion.

A steel cord with all the filaments - except for the wrapping filament—twisted in the same direction with the same twist pitch is disclosed e.g. in GB-A-2 028 393 and is know as a compact cord.

Advantages of such a steel cord are its economical way of manufacturing (in one step), its compact form which allows much steel per cross-sectional surface unit and its line contacts.

Such a steel cord, however, suffers from fretting wear between the filaments of the layer and from core migration, i.e. the filaments of the core slips out of the cord due to repeated bends.

The prior art has already provided several solutions for avoiding core migration.

First of all, core migration may be avoided by differing the twist pitch of the filaments of the core substantially from the twist pitch of filaments of the layer and by increasing the diameter of the core filaments with respect to the diameter of the layer (U.S.-A-4,627,229).

In U.S.-A-4,783,955 another solution is proposed. The diameter of the core filaments is increased with respect to the diameter of the filaments of the layer while the twist pitch of the core filaments remains the same as the twist of the filaments of the layer.

The latter solution is based on the reasoning that in order to avoid core migration two measures must be taken:

1. the filaments of the layer must apply a tightening force to the core filaments, and
2. rubber must sufficiently penetrate into the inside of the cord.

SUMMARY OF THE INVENTION

The present inventors, however, have discovered that only the second measure, sufficient rubber penetration, is necessary, the first measure resulting only in secondary effects. This discovery has led to an alternative construction where core migration is as well avoided as in the prior art. This alternative steel cord construction is the subject of the present application.

According to the present invention there is provided a steel cord for the reinforcement of rubber articles. The steel cord comprises a core, consisting of two to four steel filaments and a layer of steel filaments around said core. All the filaments have a diameter between 0.15 and 0.40 mm and are twisted in the same direction and at the same pitch. The cord has substantially over its entire length cross-sections which present gaps between adjacent filaments of the layer. The accumulated gaps are at least 0.03 mm. At least one filament of the layer has been preformed substantially differently from the other filaments.

By "substantially over its entire length" it is meant that there may be, occasionally, some cross-sections where the accumulated gaps are less than 0.03 mm. However, such a cross-section is preceded and followed by cross-sections where the accumulated gaps are at least 0.03 mm.

By "gap" between adjacent filaments it is meant the minimum distance between the filaments.

By "accumulated gaps" it is meant the sum of all the gaps over the circumference of the layer. The accumulated gaps must be at least 0.03 mm in order to allow sufficient rubber to penetrate to the inside of the cord. If the accumulated gaps are less than 0.03 mm then the chances for core migration increase.

Preforming as such is widely known in the art of steel cord manufacturing. Appropriate preforming of at least one filament of the layer "creates" - together with the possible difference in diameters between the core filaments and the layer filaments—the gaps in the layer and, consequently, promotes rubber penetration.

The extent of preforming may be characterized by the preforming ratio. The preforming ratio of a filament is the outer diameter of the helicoid formed by this filament when taken out of the cord divided by the diameter of the cord. The greater the preforming ratio the more remote are the filaments from the centre of the cord.

A filament of the layer has been preformed substantially different from the other filaments of the layer if its preforming ratio is at least four per cent (4%) greater than the greatest preforming ratio this filament could have while still having line contacts with the neighboring filaments of the core.

The advantage of the present invention that filaments with different diameters no longer have to be used and that all the drawbacks associated with this use of different diameters such as wrong filament location or position changes of filaments are avoided.

If, nevertheless, the diameter of the filaments of the core is greater than the diameter of all or some filaments of the layer, then the preforming of one or more filaments oil the layer further facilitates rubber penetration and further decreases the chances for core migration.

In a preferable embodiment of the present invention only the filaments of the inner-sheath have been preformed differently from the other filaments. This embodiment has the advantage that the necessary gaps may be created without increasing the diameter of the cord (it is hereby understood that for a given tensile strength small cord diameters are appreciated in the tire manufacturing industry because small cord diameters lead to thin rubber plies).

If the cord has three or four core filaments and at least one of these core filaments has been preformed differently, from the other core filaments then gaps may be created between the core filaments so that rubber may even penetrate to the inside of the core. Although this feature is not necessary for avoiding core migration it has the advantage of higher corrosion fatigue resistance since the central void between the core filaments is avoided.

The steel cord according to the invention may or may not be provided with an additional single steel filament which is wrapped around the steel cord.

The steel cord according to the present invention is preferably used as a reinforcement of the belt area and/or carcass area of tires.

BRIEF DESCRIPTION OF THE DRAWINGS

The invention will now be further explained and illustrated by means of a number of drawings in which FIG. 1 and FIG. 2 show cross-sections of prior art steel cord constructions;

FIG. 3 shows a cross-section of a steel cord construction according to the present invention;

DETAILED DESCRIPTION OF THE PREFERRED EMBODIMENT

Figure 4A:
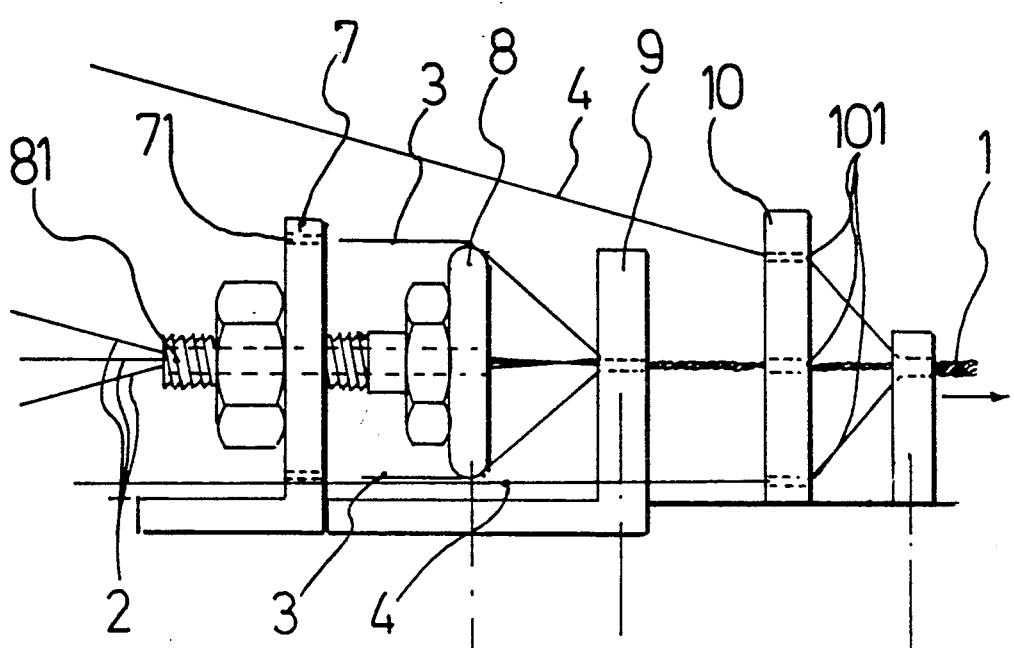
FIG. 4a shows an apparatus to manufacture a cord according to the present invention.

FIG. 1 shows the cross section of a prior art 12×1 compact cord 1. The core consists of three filaments 2. In the layer the inner-sheath consists of three filaments 3 and the outer-sheath consists of six filaments 4.

All these filaments 2-3-4 have an equal diameter, e.g. 0.22 mm. The steel cord is wrapped around by a single filament S. As may be easily seen on FIG. 1, the layer has no gaps so that rubber cannot penetrate into the inside of the cord 1.

FIG. 2 shows the cross section of another prior art 12×1 compact cord 1. The difference with the embodiment of FIG. 1 is that the diameter of the filaments 2 of the core is greater than the diameter of the filaments 3-4 of the layer, e.g. 0.22 mm core filament diameter versus 0.20 mm core filament diameter. Due to this difference in diameter the layer has three gaps $\delta_1$, $\delta_2$ and $\delta_3$, which allow rubber to penetrate and adhere to the surface of the core filaments 2 to the extent represented by the thickened line of FIG. 2.

FIG. 3 shows a cross-section of a steel cord 1 according to the present invention. The diameter of all the filaments is the same. The three filaments 3 of the inner-sheath have been preformed and occupy the place represented by full lines. If these filaments 3 were not preformed they would occupy the place represented by broken lines.

Due to the preforming the cross-section of filaments 3 oscillate over the entire length of the cord 1 between the position represented by broken lines and a position which is more remote from the centre of the cord. Dependent on the particular way of preforming and on the way of manufacturing the cord this oscillation may be planar or spatial. Due to this preforming, six gaps $\delta_1$, $\delta_2$, $\delta_3$, $\delta_4$, $\delta_5$ and $\delta_6$ are created and allow rubber to penetrate and to adhere to the surface of the core filaments 2 to the extent represented by the thickened line 21.

Comparing FIG. 3 with FIG. 2 it may be easily seen that the surface 21 which may be adhered to by rubber is much larger in the case of the invention than in the case of the prior art. This means that the steel cord according to the invention has less chance for core migration.

Since in FIG. 3 only the filaments 3 of the inner-sheath have been preformed, the diameter of the cord is not necessarily increased with respect to a prior art compact cord without preformed filaments.

A supplementary advantage of the steel cord according to the present invention is that a wrapping filament 5—if present—is supported by all the filaments 3-4 of inner-sheath and outer-sheath whereas for the prior art compact structures the wrapping filament 5 is only supported by the filaments 4 of the outer-sheath thereby "bridging" the filaments 3. A more uniform support for the wrapping filament 5 reduces the fretting wear of this filament.

A process for manufacturing the steel cord according to the present invention is illustrated in FIG. 4a.

Core filaments 2 are centrally led to a well known double twisting machine (not shown). Filaments 3 of the inner-sheath are guided through the holes 71 of a distributing disc 7 and further over the edge of a disc 8 where the layer filaments 3 form an angle and where they receive the necessary preforming.

It is to be understood that due to the effect of the downstream double twister the filaments 3 rotate around their own axis while they are rotating with the same rotation speed around the circumference of disc 8 so that this preforming operation will result in a planar oscillation of filaments 3. The preforming degree may be tuned by adjusting the distance between the distributing disc 7 and the disc 8 by means of a threaded body 81, which is connected to the disc 8: the greater the distance between the disc 7 and the disc 8 the greater the preforming ratio of filaments 3. The preforming ratio of a filament is the diameter of the helicoid formed by this filament when taken out of the cord divided by the diameter of the cord. The greater the preforming ratio the more remote the filaments are from the center of the cord.

Figure 4B:
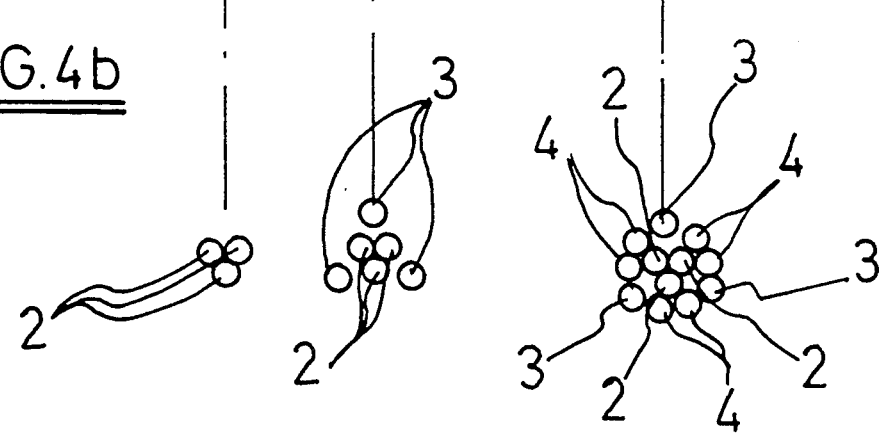
FIG. 4b shows the subsequent cross-section of a cord during its manufacturing process.

Following this preforming the filaments 3 of the inner-sheath come together with the core filaments 2 at a guiding hole 9 (see FIG. 4b). They are further led through a central hole 101 of a distributing disc 10. The other filament 4 are also led through holes 101 of distributing disc 10 and join the filaments 3 at cabling disc 11 (see FIG. 4b).

Figure 5:
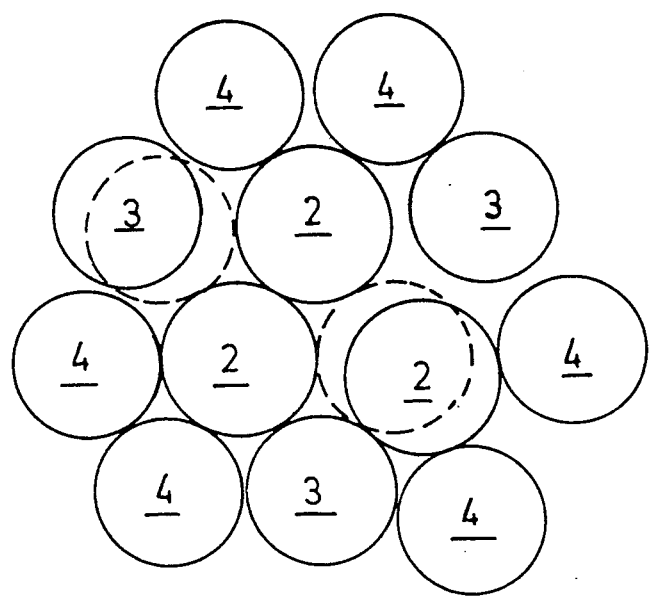
FIG. 5 shows a cross-section of another steel cord construction according to the present invention.

FIG. 5 shows a cross-section of a steel cord according to the present invention where one of the core filaments 2 has been preformed differently from the the core filaments. Gaps are created between the core filaments so that rubber may penetrate to the inside of the core.

Different properties of two prior art steel cord constructions are now compared with a steel cord according to the present invention.

Prior art cord nr 1 is a normal compact cord 12×1 with all filament diameters equal to 0.22 mm and with no filament subjected to a special preforming treatment.

Prior art cord nr 2 is compact cord the core filaments 2 of which have a diameter of 0.22 mm and the layer filaments 3-4 of which have a diameter of 0.20 mm.

The steel cord according to the present invention has filaments with all the same diameter 0.22 mm, among which the three filaments 3 of the inner-sheath have been subjected to a preforming treatment as described in relation with FIGS. 4a and 4b.

The breaking load has been determined by a tension test. The fatigue strength has been determined by the well known Hunter test.

The rubber penetration is determined by measuring the amount of air passing through a rubber block (224 mm long, 15 mm high, and 265 mm wide), in which four identical steel cord constructions are embedded at 4 bar air pressure difference. The lesser amount of air passing the greater the rubber penetration.

In order to determine whether there is core migration or not the steel cord is embedded in a rubber cylinder and this cylinder is then subjected to a number of repeated bendings.

If the core filaments 2 slip out of the cord there is core migration, in the opposite case there is no core migration. The accumulated gaps are measured manually on an enlarged photo of a number of cross-sections taken along the length a cord. The average value is mentioned in the table.

Most of the above-cited tests are described more in detail in the paper by Bourgois Luc, "Survey of Mechanical Properties of Steel Cord and Related Test Methods", Tire Reinforcement and Tire Performance, ASTM STP 694, R. A. Fleming an D. I. Livingston, Eds., American Society for Testing and Materials, 1979, pp. 19-46.

TABLE

|  | PRIOR ART | | INVENTION |
| --- | --- | --- | --- |
|  | 1<br>12 × 0.22 cc | 2<br>3 × 0.22 +<br>9 × 0.20 cc | 12 × 0.22<br>inner-sheath<br>preformed |
| diameter (mm) | 1.16 | 1.09 | 1.16 |
| breaking load (N) | 1310 | 1223 | 1310 |
| elongation (%) | 2.74 | 2.73 | 3.01 |
| fatigue strength (embedded) (N/mm$^2$) | 950 | 1050 | 900 |
| rubber penetration (l/H) | 8.7 | 2.0 | 3.3 |
| core migration | yes | no | no |
| adhesion | 645 | 676 | 656 |
| accumulated gaps (mm) | 0 | 0.12 | 0.04 | cc = compact cord

As may be derived from the table, core migration is avoided in the cord according to the invention as in prior art cord 2, despite the fact that the accumulated gaps in the invention cord are much smaller (0.04) than in prior art cord 2 (0.12).

Figure 6:
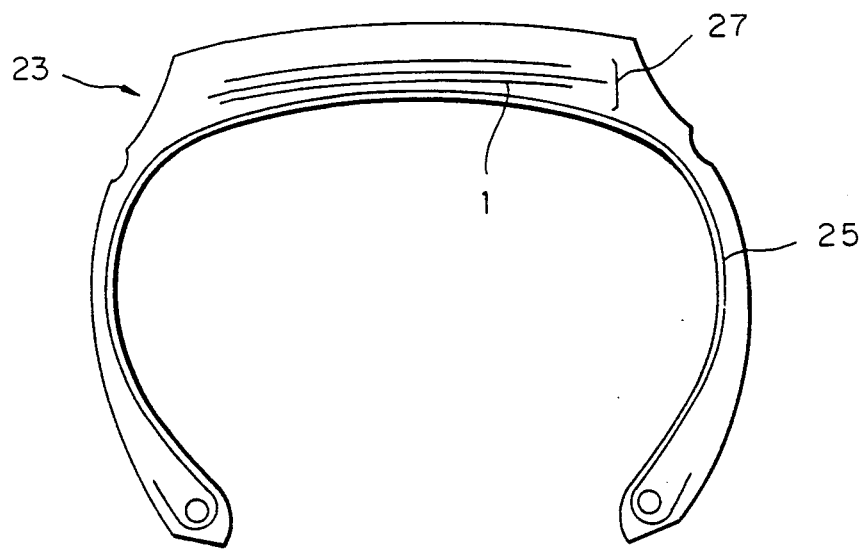

FIG. 6 shows a tire 23 having a carcass 25 and a belt area 27. The belt area 27 is reinforced with the steel cord 1. Likewise, the carcass 25 may also be reinforced with the steel cord 1.

It is to be understood that the invention is not limited to compact cord constructions comprising only one layer around the core, but that it may also be applied to constructions compressing more coaxial layers around the core. Proper preforming of filaments of the radially most inner layer causes the global cross-sectional circumference to be greater than in a normal compact configuration, which makes that the filaments of the radially outer layer do not longer make contact with each other and allow rubber to penetrate to the core filaments.

We claim:

1. A steel cord (1) for the reinforcement of rubber articles, said steel cord comprising:

a core consisting of two to four steel filaments (2) and a layer of steel filaments (3,4) around said core, all of said filaments (2, 3, 4) having a diameter between 0.15 and 0.40 mm and being twisted in the same direction and at the same pitch, said cord (1) having over a substantial portion of its entire length cross-sections where the accumulated gaps between adjacent filaments of said layer are at least 0.03 mm;

wherein at least one filament of said layer has a preforming ratio of at least four percent greater than a greatest preforming ratio that said at least one filament can have while still maintaining line contacts with neighboring ones of said core filaments, said preforming ratio being defined as a ratio of the outer diameter of a helicoid formed by said at least one filament divided by the diameter of said cord.

2. A steel cord (1) according to claim 1 wherein the diameter of the filaments (2) of said core is greater than the diameter of filaments (3, 4) of said layer.

3. A steel cord according to claim 1 wherein the diameter of all said filaments (2, 3, 4) is the same.

4. A steel cord according to claim 1 wherein said layer consists of filaments (3) facing radially inward toward two filaments (2) of said core and forming an inner-sheath, and of filaments (4) facing only radially inward toward one filament of said core and forming an outer-sheath, and wherein only filaments of said inner-sheath have been preformed substantially differently from the other filaments.

5. A steel cord (1) according to claim 1 wherein said cored (1) has three or four core filaments (2) at least one of said core filaments (2) has been preformed differently from other core filaments (2).

6. A steel cord (1) according to claim 1 wherein an additional single steel filament (5) is wrapped around said steel cord.

7. A steel cord as recited in claim 1, wherein said at least one filament is in a non-contact relationship with neighboring ones of said core filaments.

8. A tire comprising:

a belt area;

a carcass;

a steel cord (1) including a core having two to four steel filaments (2) and a layer of steel filaments (3, 4) around said core, all of said filaments (2, 3, 4) having a diameter between 0.15 and 0.40 mm and being twisted in the same direction and at the same pitch, said cord (1) having over a substantial portion of its entire length cross-sections where the accumulated gaps between adjacent filaments of said layer are at least 0.03 mm;

wherein at least one filament (3, 4) of said layer has, a preforming ratio of at least four percent greater than a greatest preforming ratio that said at least one filament can have while still maintaining line contacts with neighboring ones of said core filaments, said preforming ratio of said at least one filament being defined as a ratio of the outer diameter of a helicoid formed by said at least one filament divided by the diameter of said cord and wherein said preforming ratio of said at least one filament is different from a preforming ratio of the other filaments of the layer, and at least one of the belt area and the carcass area are reinforced with said steel cord.

* * * * *